Aug. 20, 1968  H. O. SCHERENBERG  3,397,684
PROCESS AND APPARATUS FOR FACILITATING THE STARTING
OF DIESEL ENGINES AND THE LIKE
Filed Dec. 15, 1965  2 Sheets-Sheet 1

INVENTOR
HANS O. SCHERENBERG

BY *Dicke + Craig*
ATTORNEYS

United States Patent Office 3,397,684
Patented Aug. 20, 1968

3,397,684
PROCESS AND APPARATUS FOR FACILITATING THE STARTING OF DIESEL ENGINES AND THE LIKE
Hans O. Scherenberg, Stuttgart-Heumaden, Germany, assignor to Daimler-Benz Aktiengesellschaft, Stuttgart-Unterturkheim, Germany
Filed Dec. 15, 1965, Ser. No. 514,059
Claims priority, application Germany, Dec. 15, 1964, D 46,056; Feb. 25, 1965, D 46,607
6 Claims. (Cl. 123—179)

ABSTRACT OF THE DISCLOSURE

A supercharged diesel engine with a combustion air cooler for removing the heat of compression of the supercharger and a preheater for heating all of the combustion air within the cooler heat exchanger for cold weather starting and the initial operation.

Background of the invention

In general, the ignition of the injected fuel is achieved in diesel engines by the high compression of the sucked-in air. The combustion air is compressed so highly that its resulting compression end temperature suffices for the ignition of the fuel. The compression end temperature is dependent, in addition to other factors, from the atmospheric air temperature. A higher atmospheric air temperature increases the compression end temperature and a lower atmospheric temperature decreases the same. In general, a temperature of 20° C. on the part of the air to be sucked-in is assumed as the basis for the thermo-dynamic considerations. If a diesel engine now has to be started at very low outside or atmospheric air temperature then the compression end temperature may drop to such an extent that the ignition is rendered very difficult or even becomes impossible. Hence, for a completely satisfactory ignition also at very low outside or atmospheric air temperatures starting assists have to be used.

One known starting assist used heretofore is the preheating of the combustion air. Glow or starting plugs are used therefor with diesel engines with subdivided combustion space. A considerable disadvantage of this method is the fact that the glow or starting plug only heats up the prechamber filling. If the engine does not turn over after the first ignition, then the warmed-up air is flushed or scavenged out of the prechamber during the following cycles. Though the then following fresh air is still somewhat warmed-up by the heat stored in the prechamber walls, however, this is without any greater significance as, on the one hand, the stored heat quantity is slight and, on the other, a relatively poor heat transfer exists from the prechamber walls to the combustion air. A preliminary heating of the starting or glow plugs over a longer period of time is not possible, however, without limitations by reason of the low output capacity of the battery at low temperatures.

Known in the prior art is also the heating of the engine cooling water in order to indirectly preheat thereby the combustion air. The hot engine cooling water thereby flows about the cylinder and the combustion air is preheated by way of the cylinder walls. However, this prior art method is incomplete and inadequate.

Furthermore, for preheating the combustion air, electric air preheaters are known in the prior art whose main component parts are an intermediate flange having a glow plug filament which are inserted into the intake suction pipe of the individual cylinders. The heat output of the glow plug filament is, however, limited. Also, this arrangement is very expensive.

Summary of the invention

The present invention is concerned with the task to facilitate the starting of diesel engines at low outside or atmospheric air temperatures in a more efficacious and simple manner. It is proposed as solution according to the present invention to preheat over the duration of the starting operation all of the combustion air sucked in by the diesel engine.

For this purpose, a heat-exchanger is arranged in the common supply pipe of the combustion air which is connected by way of pipe lines, equipped with closure and shifting valve means, with the heat-exchanger of a heating apparatus. This heat-exchanger in the common supply pipe therefore warms up all of the combustion air flowing through the supply pipe or line. With liquid-cooled diesel engines, the preheating apparatus for the engine cooling liquid may be used as the heating apparatus. With supercharged diesel engines having a boost intercooling system for normally cooling the supercharged combustion air, the supercharger intercooler already present in the common intake pipe may be used as heat-exchanger for the preheating of the combustion air. With a highly supercharged diesel engine having a supercharger intercooler for the supercharged combustion air and a preheating apparatus for the engine cooling liquid, particularly favorable conditions are therefore present for the realization of the inventive concept. The preheating apparatus and the supercharger intercooler are utilized for the preheating of the combustion air in accordance with the present invention.

Since the capacity of the customary preheating apparatus for the cooling liquid of the engine might not be sufficient for a simultaneous preheating of the engine cooling liquid, of the engine oil and of the combustion air sucked-in by the running engine, according to a further feature and development of the present invention the cooling liquid circulatory system is subdivided into two essentially separate, parallel circuits; namely, one for the engine cooling liquid and one for the liquid of the supercharger intercooler. These two separate cooling liquid circulatory systems are adapted to be connected individually to the common preheating apparatus so that a selective heating of the cooling liquids can be realized. Moreover, as a further advantageous construction and feature of the present invention, the recooler or heat-exchanger of the supercharger intercooler installation may be so interconnected that it can be disconnected from the cooling liquid circulatory system for the duration of the starting operation. The cooling liquid present in the recooler then does not need to be heated at the same time.

Even if the engine has already ignited, the recooler may remain disconnected for such length of time until its use appears necessary. For this purpose the circulating pump for the cooling liquid of the supercharger intercooler installation, which is mechanically driven appropriately by the engine, is provided with a by-pass line to permit this pump to operate under no-load condition while the engine runs and before the intercooler system is rendered operable.

Thus, to achieve the basic concept of the present invention aiming at facilitating the starting operation of internal combustion engines at low outside temperatures, the present invention proposes to preheat all of the combustion air sucked-in by the engine during the entire starting phase. As the means to achieve this aim, a heat-exchanger is arranged in the common supply line or intake pipe of the combustion air, which—intended to preheat the sucked-in air over the entire duration of the starting operation—is adapted to be connected by means of pipe lines provided with closure and shifting valve means with a heat-exchanger of a heating apparatus. Consequently, this heat-exchanger warms up all of the combustion air flowing through the common supply pipe. With liquid-cooled diesel engines, the preheating apparatus for the cooling liquid of the engine may be used as heating apparatus. With supercharged diesel engines having a boost intercooling system for the charging air, the supercharger intercooler can be used as heat-exchanger for the preheating of the combustion. As also mentioned above, with a highly supercharged diesel engine provided with a supercharger intercooler for the charging air and with a preheating apparatus for the engine cooling liquid, particularly favorable conditions thus exist for the realization of the basic concept of the present invention.

Two separate cooling medium circulatory systems may thus be formed for the cooling system of the engine and for the intercooling system of the boost or charging air which are adapted to be individually connected to the common preheating apparatus so that a selective heating of the cooling liquid can be realized.

Such an arrangement of the supercharger intercooler in a cooling medium circulatory system, which is separate from the engine cooling liquid circulatory system, is favorable particularly in view of the slight temperature difference present in part between the temperature of the cooling liquid for the charging or boost air and the temperature of the cooling liquid for the engine. However, the higher expenditures connected with the second cooling medium circulatory system have to be accepted with such a system.

To avoid this increased expenditure is also one of the objects of the present invention. With an installation for facilitating the starting of supercharged diesel engines by means of a heat-exchanger for the boost intercooling system normally intended to cool the supercharged combustion air and arranged in the common supply pipe of the engine combustion air, the heat-exchanger for the boost intercooler system contains, in accordance with the present invention, either a heat-exchange surface inset conducting a liquid and adapted to be heated which is connected with the engine cooling liquid circulatory system or a heat exchange surface inset also adapted to be heated and adapted to be acted upon by gases. A very effective preheating of the combustion air of the engine is made possible thereby.

The heat-exchanger with a heat exchange surface inset conducting a liquid is preferably arranged in the cooling liquid circuit preferably between the engine and the cooling liquid radiator. Particularly with highly supercharged multi-fuel engines, the temperature difference between the charging air and the cooling water leaving the engine is sufficient in order to obtain an effective cooling of the charging air when the engine operates.

In order to heat up the heat exchange surface inset and therewith the combustion air of the engine during starting of the engine, a heating apparatus is interconnected into the engine cooling liquid circulatory system. This heating apparatus may be a cooling water preheater which is arranged upstream of the heat-exchanger for the booster intercooler so that the heated "cooling medium" flows at first through the heat-exchanger for the boost intercooler and only thereafter through the engine block whereby the charging air is preheated to as high as possible a temperature.

During the starting operation, the engine cooling liquid in this case is thus preheated in the preheating apparatus. This preheated cooling liquid is pumped through the circulatory system and warms up the heat exchanger for the boost intercooler and the engine. After the starting and after attaining the favorable operating temperatures of the engine, the heating system is turned off and the engine and boost intercooler start to operate normally.

In order that the cooling liquid need not be pumped constantly through the turned-off preheating apparatus with a normally operating engine, the preheating apparatus may also be connected in the cooling liquid circulatory system by way of a parallel branch connection. This branch connection may be closed and opened by a control valve in dependence on the temperature of the cooling medium.

In order to fulfill its double function, namely, on the one hand, to heat up the charging or boost air during the starting of the engine, and on the other, to cool the charging or boost air during the normal operation of the engine, the heat-exchanger for the boost intercooler system normally operable to cool off the charging or boost air may also include two separate heat-exchange surface insets conducting separate heat exchange media and essentially consisting preferably of pipe assemblies through which flows the charging or boost air. One of these heat exchange surface insets is interconnected into the cooling liquid circulatory system and the other is connected to the input and output connections of a heating apparatus. Depending on which of the heat exchange surface insets is operable, all of the charging or boost air is either preheated or cooled.

In another advantageous construction according to the present invention the heat-exchanger for the boost intercooler system may possess a heat exchange surface inset adapted to be acted upon by gases and may be arranged within a cooling air channel adapted to be closed. A further gas channel, also adapted to be closed, is connected to the input side of the cooling air channel section, which further gas channel is in communication with at least one hot gas source. During the normal operation of the engine, the combustion air supplied by the supercharger is cooled by the cooling air flowing through the heat-exchanger surface inset. During the starting of the engine, the cooling air channel is closed and the gas channel is opened by appropriate control devices so that in the place of the cooling air, the hot gases of one or several hot gas sources are now conducted into the heat exchange surface inset and warm up the combustion air of the engine. A hot gas generator independent of the engine and/or the engine itself is used as the source for the hot gases. If now the hot gas generator is used alone for the production of the hot gases, then it remains turned on and interconnected over the entire duration of the starting operation. If, however, the engine itself also is utilized for the production of the hot gases and its exhaust gases or only a part thereof are conducted into the heat-exchanger for the boost intercooler system, then the hot gas flow of the hot gas generator may be enhanced by the engine exhaust gases or may be completely replaced by the engine exhaust gases after the engine has turned over. Appropriate conventional control devices are provided in this case whose adjustments make it possible to replace completely the hot gas stream of the hot gas generator with the engine exhaust gas stream. If the engine exhaust gases have taken over the preheating of the combustion air, the hot gas generator is turned off. If the engine rotational speed increases further so that an even lesser preheating of the combustion air is necessary, then the engine exhaust gas quantity conducted into the heat-exchanger is progressively and increasingly throttled by conventional valve or slide valve means. Upon attaining a predetermined engine rotational speed, the supply of the exhaust gases into the heat exchange surface inset is completely closed off and the cooling air channel is reopened. Instead of the engine rotational speed also the output of the engine or any other variable magnitude may be utilized for the control of the supply of hot gases into the heat exchange surface inset.

Accordingly, it is an object of the present invention to provide a starting system for diesel engines, which greatly facilitates the starting thereof.

Another object of the present invention resides in a process and installation for facilitating the starting of diesel engines, particularly when the outside temperature drops to a very low value.

Still another object of the present invention resides in a process and apparatus for facilitating starting of diesel engines which is completely satisfactory in operation, relatively inexpensive, and offering great versatility.

Still another object of the present invention resides in a process and apparatus for facilitating starting of diesel engines which makes optimum use of existing equipment of the diesel engine installation, particularly of a supercharged diesel engine, in order to facilitate greatly and effectively the starting of the engine at very low atmospheric temperature conditions.

Still a further object of the present invention resides in an apparatus which enables a very effective preheating of all of the combustion air of the engine during the starting phase thereof.

*Brief description of the drawing*

These and other objects, features, and advantages of the present invention will become more obvious from the following description when taken in connection with the accompanying drawing which shows, for purposes of illustration only, several embodiments in accordance with the present invention, and wherein.

*Detailed description of the drawing*

Figure 1:
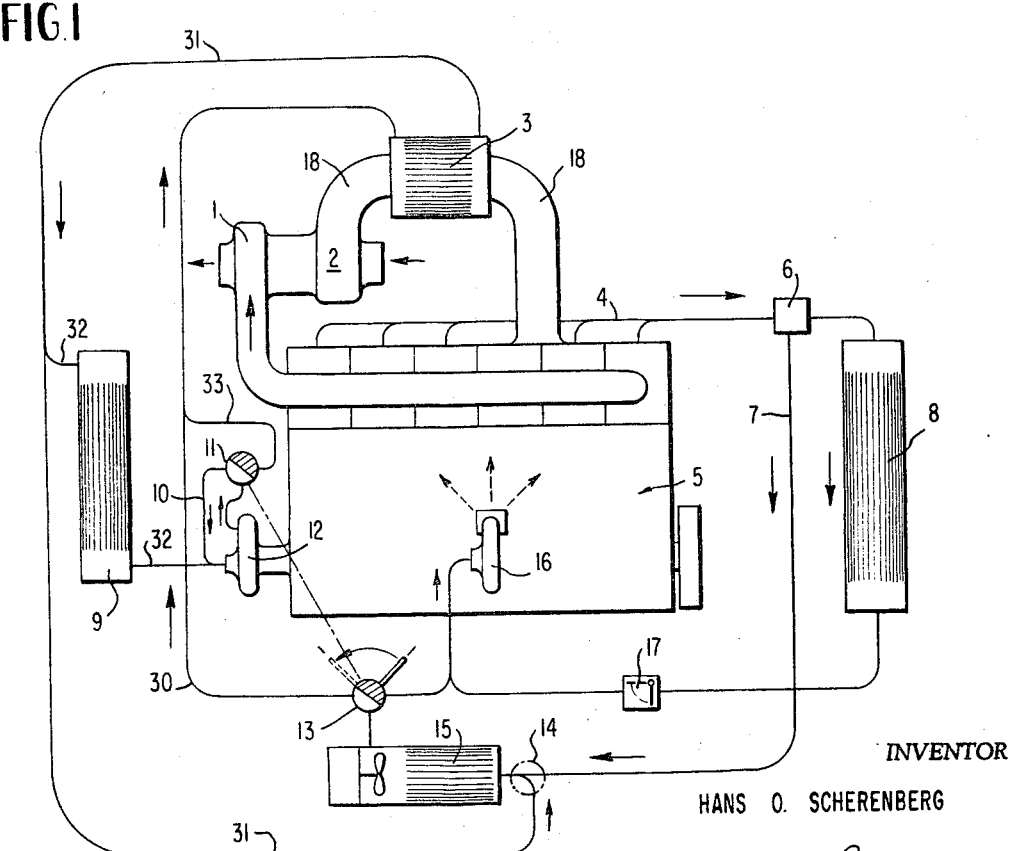
FIGURE 1 is a schematic view of one embodiment of an installation in accordance with the present invention for facilitating starting of diesel engines.

Referring now to the drawing wherein like reference numerals are used throughout the various views to designate like parts and more particularly to FIGURE 1, reference numeral 5 designates therein a conventional diesel engine. The exhaust gas turbine 1, connected in a known manner to the exhaust gas manifold of the engine 5, drives an air compressor or supercharger 2 which, in turn, supplies air from the atmosphere by way of the boost air intercooler 3 to the common intake supply line or manifold 18 of the engine 5 through which is supplied the combustion air for the engine 5. The engine 5 is provided with a cooling water circulatory system which includes a common cooling water discharge line 4 through which flows the cooling water from the engine 5 to the cooling water thermostat 6 of conventional construction. The thermostat 6 controls in the usual manner the flow of the cooling water coming from the engine 5 either into the by-pass 7 or into the engine radiator 8. An engine-driven water pump 16 circulates the cooling liquid through the system.

A water pump 12 is provided for the cooling liquid of the boost intercooler system which is appropriately driven by the engine 5. A preheater 15 of appropriate conventional construction is adapted to be selectively connected with its output, by way of the three-way valve 13 either with the input of the water pump 16 or with a line 30 leading to the input of the boost air intercooler 3. A three-way valve 11, controlling the flow of the cooling liquid of the boost intercooling system through recooler or heat-exchanger 9 is mechanically coupled to the three-way valve 13, and the two three-way valves 11 and 13 may additionally be coupled to a third three-way valve 14 whose function will be described more fully hereinafter. The output of radiator 8 is connected with the engine-driven cooling-liquid pump 16 by way of a conventional check valve 17. The output of the boost air intercooler 3 is connected by way of line 31 and three-way valve 14 to the input of the preheater 15, while the branch line 32 leading from line 31 includes the recooler 9 for the boost air intercooler system.

It follows from the foregoing description, that the cooling liquid—which may be water in the given embodiment—for the engine cooling system and the boost intercooler system of the liquid-cooled supercharged diesel engine schematically illustrated in FIGURE 1, circulates in two separate circulatory systems which are adapted to be selectively connected by means of valves 13 and 14 with the preheating apparatus 15. All lines, valves, and the like not necessary nor contributing to the understanding of the present invention have been omitted for sake of clarity. In the drawing, the arrows indicate the direction of flow in the lines or respective apparatus.

*Operation*

The operation of the system in accordance with the present invention as illustrated in FIGURE 1 for purposes of facilitating the starting of diesel engines is as follows:

If the cold engine 5 to be started at great cold, i.e. at very low atmospheric air temperatures, then at first the preheating apparatus 15 exercising the function of a heating apparatus is turned on or set into operation. The preheating apparatus 15 operate in the usual manner with diesel fuel as the heating material and possess their own circulating pump. This circulating pump forces the warmed-up water by way of the three-way valve 13, now in the "normal and engine preheating" position indicated in dash line, to the engine cooling water pump 16. The water flows through the stationary engine cooling water pump 16, the oil heat-exchanger (not shown), the engine crankcase and the cylinder heads and then again flows back cooled off by way of the common cooling water discharge line 4, the cooling water thermostat 6 and by-pass line 7 to the preheating apparatus 15. The cooling water thermostat 6 closes off with a cold engine in a known manner the cooling water line to the engine radiator 8 so that only the quantity of cooling water present in the engine 5 has to be heated up. The check valve 17 prevents that the warmed up water flows back to the preheating apparatus 15 in by-passing relationship to the engine 5.

If the engine 5 is sufficiently preheated, the three-way valve 13 is displaced either manually or by conventional means automatically in dependence on the temperature into the position "cold starting" shown in full line in the drawing.

The engine cooling water circulatory system is now disconnected from the preheating apparatus 15. The heat supplied by the preheating apparatus now serves exclusively to heat the boost intercooler 3 by way of line 30. Contrary to its normal function to remove heat from the combustion air, heat is now supplied by the boost intercooler 3 to the combustion air flowing through the supply or intake pipe 18. The preheated cooling water now flows from the output of the preheating apparatus 15 by way of valve 13 and through line 30 into the boost intercooler 3 and from the output of the latter back through line 31 and valve 14 into the preheating apparatus.

Simultaneously with the adjustment of the three-way valve 13 also the three-way valve 11 is so adjusted into the position indicated in the drawing when the valve 13 is placed into the "cold starting" position that the flow through the heat-exchanger 9 is blocked. Hence, the water present within the heat-exchanger 9 need not be heated up by the preheating apparatus 15.

As soon as the boost intercooler 3 reaches its highest temperature which takes place relatively rapidly, the engine 5 can be started.

The diesel engine with exhaust gas supercharging starts practically as suction engine since no exhaust gases are available as yet form the drive of the exhaust gas turbine 1 which drives the air compressor 2 in the usual manner. The sucked-in quantity of air which is to be warmed up in its passage through the boost intercooler 3 is thereby correspondingly smaller.

If the engine 5 has turned over, i.e., has started, the preheating of the sucked-in combustion air should be continued appropriately for such length of time until the engine 5 runs smoothly.

As soon as the engine 5 turns over, also the water pump 12 for the cooling liquid of the boost intercooler 3 starts to operate. However, as already mentioned, since the valve 11 closes off the pressure line 33 to the boost intercooler 3, no water is pumped through the heat-exchanger 9. In order that the pump 12 does not pump against the closed slide valve 11 and thus absorbs an unnecessarily high power loss, the by-pass line 10 may be provided which connects and short-circuits the pump output with the pump input.

Once the engine 5 runs smoothly, at first the preheating apparatus 15 may be turned off. The induction air is then no longer heated by the boost intercooler 3 but also is not yet cooled thereby. If the temperature of the boost air downstream of the boost intercooler 3 becomes excessive, even without heating, the boost intercooler 3 may again be turned on as a last step in that the valves 11 and 13 are returned to the "normal" position. This can take place either manually or appropriately automatically in dependence on the boost air temperature downstream of the boost intercooler 3 or in dependence on the exhaust gas temperature by any conventional, known means.

If the engine cooling circulatory system and the boost or charging air intercooling or heating circulatory system are to be completely separate from each other, i.e., without pressure equalization or water level equalization, then a third conventional three-way valve has to be installed in the input to the preheating apparatus 15 indicated in FIGURE 1 of the drawing in dash and dot line which is actuated simultaneously with the valves 11 and 13 and which connects the input of the preheating apparatus either with the by-pass line 7 or the line 31.

Thus, with great outside cold the starting operation may be summarized as follows: At first the preheating apparatus 15 warms up the engine by way of the engine cooling water and eventually also the engine oil. Shortly before the starting, the engine cooling water circulatory system is disconnected from the preheating apparatus 15 and instead the cooling water circulatory system for the boost intercooler is connected to the preheating apparatus 15. After that the engine is started. The entire heat produced by the preheating apparatus 15 is now transferred to the induced air. The heat output of conventional preheating apparatus suffices in order to heat continuously the entire induced air from about −40° C. to about 0° C. at low rotational speeds and lowest average pressure by means of a boost intercooler of normal size.

Consequently, according to the present invention a highly efficacious preheating of the combustion air is achieved without large additional expenditures in that especially the already present preheating apparatus of the engine cooling water and the also present boost intercooler are utilized for that purpose which preheating is effective from the starting up to a smooth, safe running of the engine.

Figure 2:
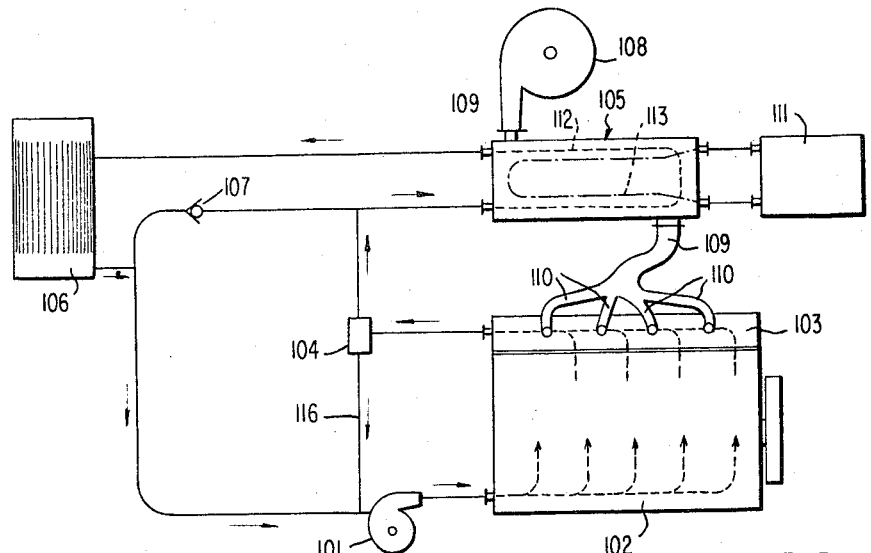
FIGURE 2 is a simplified schematic view of a modified embodiment of a system in accordance with the present invention for facilitating starting of diesel engines which includes an engine cooling liquid circulatory system provided with a heat-exchanger for the charging or boost air which is adapted to be heated up.

In the embodiment of FIGURE 2, a supercharged, liquid-cooled combustion engine 102 is illustrated with a boost intercooler system for the charging or boost air. The supercharging takes place by way of a supercharger or compressor 108 which is driven either mechanically or also by the exhaust gases of the engine as described above. The boost intercooler generally designated by reference numeral 105 is interconnected into the cooling water circulatory system and includes a pipe coil 112 (only schematically shown in the drawing), through which flows the cooling water, and a separate additional pipe coil 113 which is connected to a heating apparatus 111 of conventional construction and through which flows the heated liquid of the heating apparatus 111 when the latter is set into operation.

The cooling medium is pumped into the engine housing 102 by means of the cooling medium pump 101. In the engine housing 102 the cooling medium is distributed, as indicated by the dash-line arrows, and eventually reaches the engine head 103. The cooling liquid is conducted from the engine head 103 by way of the thermostat 104 and the boost intercooler 105 to the radiator or cooler 106 and from there back to the pump 101. A by-pass line 116 is arranged between the thermostat 104 and the pump 101 which serves in a known manner for the control of the cooling water temperature by means of the thremostat 104. Additionally, an excess pressure line provided with an excess pressure valve 107 is interconnected into the cooling liquid system. All the other parts of the cooling installation are omitted for sake of clarity.

*Operation*

If the engine 102 is to be started at low outside temperatures, then the heating apparatus 111 is turned on. The pipe coil 113 in the boost intercooler 105 is heated up and the air supplied by the compressor 108 is warmed up before it reaches from the common supply pipe or manifold 109 the branch lines 110 thereof and from there into the individual cylinders of the engine 102. The cooling water line to the radiator 106 is closed off by the thermostat 104 and the cooling water flows directly back to the pump 101 by way of the by-pass line 116. A rapid heat-up of the engine 102 is the result of such an arrangement and the starting operation is shortened by the heat-up charging or boost air.

If the engine 102 has reached the operating temperature favorable therefor, then the thermostat 104 opens the main line of the cooling system and the cooling liquid is conducted through the radiator 106. On its way to the radiator 106 the cooling liquid is at first conducted through the boost intercooler 105 interconnected into the cooling medium circulatory system and cools thereat the boost air. The heating apparatus 111 is turned off after the starting of the engine 102.

In order to be able to preheat also the cooling liquid during the starting operation, a cooling water preheating apparatus may be utilized as the heating apparatus which is interconnected directly into the cooling medium circulatory system. However, in order that the cooling medium does not have to be pumped continuously through the turned-off preheater with a normally operating engine, the preheating apparatus may be connected into the cooling circulatory system by way of a parallel branch line.

Figure 3:
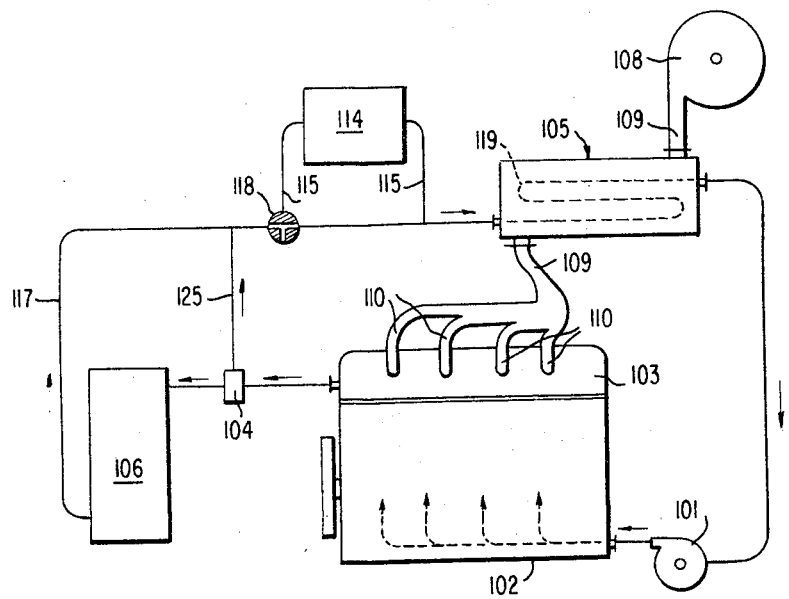
FIGURE 3 is a simplified schematic view of a still further modified embodiment of a system in accordance with the present invention for facilitating starting diesel engines which includes an engine cooling liquid circulatory system again provided with a heat-exchanger for the boost air which is adapted to be heated.

In the schematic showing of FIGURE 3 which shows another advantageous arrangement of the cooling medium installation according to the present invention, both the cooling liquid and the boost air are preheated for the starting operation of the engine 102. A preheating apparatus 114 is connected to the cooling liquid circulatory system by way of a control valve 118 and a branch line 115. At first, the preheating apparatus 114 is connected by appropriate adjustment of the control valve 118 with the cooling medium circulatory system for the starting operation and is thus effectively used in the operation. The warmed-up cooling medium is then pumped by means of a pump arranged in the preheating apparatus 114 or by the pump 101 through the cooling medium installation. The warmed-up cooling medium thereby reaches at first the pipe coil 119 of the boost intercooler 105 and gives off thereat heat to the boost air supplied by the compressor 108. The cooling medium flows from the boost intercooler 105 to the pump 101 and from there into the engine 102 from which it flows off to the thermostat 104. The thermostat 104 opens and closes the branch line 125 which by-passes the radiator 106. The control valve 118, like the thermostat 104 operates preferably automatically in dependence on the temperature of the cooling medium by conventional means. However, the valve 118 may also be manually actuated.

Thus, the following circuits result for the warmed-up cooling medium during the starting operation.

Preheating apparatus 114, boost intercooler 105, pump 101, engine 102, thermostat 104, line 125, control valve 118, and preheating apparatus 114.

The preheating apparatus 114 is interconnected into the cooling medium circuit by the control valve 118 and the radiator 106 is disconnected by the thermostat 104. After the starting of the engine 102, the preheating apparatus 114 is then disconnected from the cooling circuit by means of valve 118 and the radiator 106 is interconnected into the system by means of thermostat 104. The following cooling medium circuit then results: pump 101, engine 102, thermostat 104, radiator 106, line 117, control valve 118, boost intercooler 105 and pump 101.

A further embodiment in accordance with the present invention proposes to heat directly the boost intercooler. This can be achieved in that the hot gases of a preheating apparatus are conducted directly to the boost intercooler.

Figure 4:
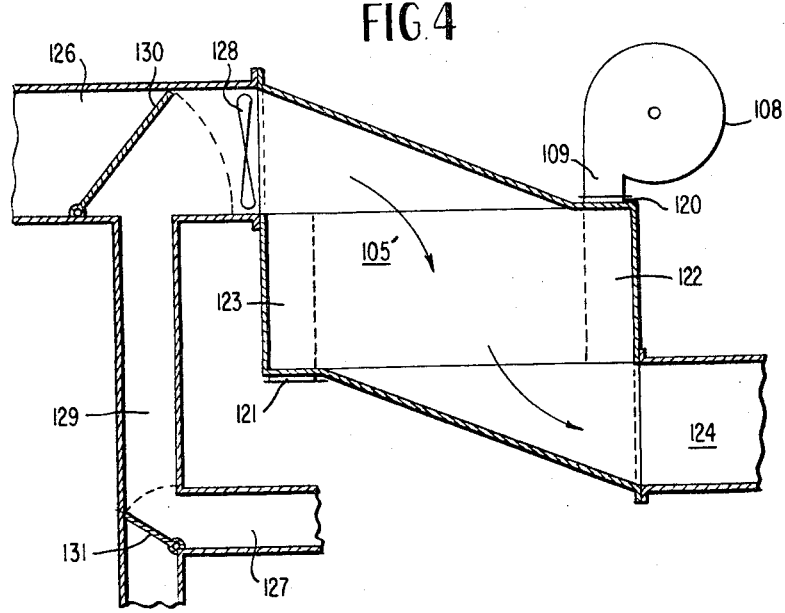
FIGURE 4 is a partial cross-sectional view through a heat-exchanger for the boost air in accordance with the present invention which is adapted to be heated by hot gases.

In the embodiment of FIGURE 4, a boost intercooler generally designated by reference numeral 105' is illustrated which can be heated by hot gases during the starting operation. The boost intercooler 105' possesses a heat-exchange surface inset for the conduction of the cooling medium which in this case is, for example, air; the heat-exchange surface inset also serves simultaneously for the conduction of the hot gases for heating-up the induced air over the duration of the starting operation. The main task of the heat-exchanger 105' is, as is also the case with the heat-exchangers described above, to cool the boost air during normal operation of the engine. The cooling air necessary for the boost intercooling system is conducted to the heat-exchanger 105' by way of the cooling air channel 126. The cooling air traverses the heat-exchange surface inset equipped with flow pockets following approximately the arrows and reaches the atmosphere by way of the connecting piece 124 of the cooling air channel. The flow pockets of the heat-exchange surface inset may be constituted, for example, by undulated lamellae sheet metal strips. The supply of the cooling air can be realized by a blower 128 alone or also in case of a motor vehicle, by a blower and the dynamic pressure. The charging or boost air supplied by the compressor 108 enters by way of the connecting piece 120 into the chamber 122 of the heat-exchanger 105' for the boost air, flows through the pockets of the heat-exchange surface inset and the chamber 123 and is conducted away to the engine (not shown) by the connecting piece 121.

A gas channel 129 is connected to the input side section of the cooling air channel. This gas channel 129 serves for the conduction of the hot gases of a hot gas generator of conventional construction (not shown). For purposes of starting the engine, the hot gas generator is turned on and the hot gases produced therein are conducted through the gas channel 129 into the cooling air channel 126 and from there by way of the heat-exchanger 105', along the same path as the cooling air, into the atmosphere. The hot gases give off their heat to the engine combustion air within the heat-exchanger 105'. The cooling air channel 126 is closed during this period of time by the valve 130. If the valve 130 is pivoted downwardly as viewed in the drawing, then it closes the opening of the gas channel 129.

The gas channel 129 has a branch line 127 which is in communication with the exhaust pipe of the engine (not shown). The valve 131 may close off the gas channel 129 or the aperture of the branch line 127 or may also assume any intermediate position. Such a construction of the gas channel 129 with the branch line 127 permits a preheating of the engine combustion air for the starting of the engine by the hot gases of the gas generator and, after the starting of the engine, a further preheating of the engine combustion air by the engine exhaust gases. Consequently, during the starting of the engine, the hot gas generator 105' is turned on, the branch line 127 of the gas channel 129 is closed off by the valve 131, and the cooling air channel 126 is closed off by the valve 130. The hot gases of the hot gas generator are then conducted through the heat-exchanger 105'. After the starting of the engine, the gas channel 129 is gradually closed by the valve 131 whereby simultaneously the branch line 127 is opened. This has a consequence that the hot gas flow of the hot gas generator is throttled and is replaced by the engine exhaust gas flow. Following this operation, as the engine temperature further rises, the engine exhaust gas stream flowing through the branch connection 127 can be further throttled and upon reaching an engine temperature necessary for the normal operation of the engine can be closed off completely. Thereafter, the cooling air channel 126 is continuously opened so that also the cooling air quantity is completely matched to the engine temperature.

The application of the last-mentioned installation is particularly effective with multi-fuel engines. Furthermore, the present invention is also applicable with aspirating engines without supercharging, especially with engines for commercial vehicles.

Thus, while I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:

1. A diesel engine, comprising a liquid-air heat exchanger for passing therethrough the combustion air; a source of heat independent of combustion within the working chambers of the diesel engine; a liquid heating system connected to said heat exchanger and said source of heat for heating all of the combustion air for cold starting and early operation prior to the combustion air entering the working chambers; turbo-supercharger means for compressing all of the combustion air prior to its entry in the working chambers; combustion air cooler means, including said heat exchanger and a liquid cooling system fluid connected to said heating exchanger, for pre-cooling the combustion air within said heat exchanger during normal operation of said engine to remove at least some of the heat of compression of said turbo-supercharger; and means to switch from one system to the other.

2. The diesel engine according to claim 1, wherein said means to switch includes temperature responsive control means for automatically operatively connecting said source of heat with said heat exchanger below a predetermined temperature and automatically operatively connecting said cooling system with said heat exchanger above a predetermined temperature.

3. The device of claim 2, including an engine block containing the working chambers; a liquid cooling radiator; and engine cooling system having a circulating liquid medium fluid connected between said block and said radiator; an engine heating system including said circulating liquid medium fluid connected between said block and said source of heat, for heating said block for cold engine starting; and means to switch from said engine cooling system to said engine heating system, and from said engine heating system to said engine cooling system.

4. A diesel engine having a heat exchanger with a source of heat independent of combustion within the working chambers of the diesel engine for heating all of the combustion air for cold starting and early operation prior to the combustion air entering the working chambers, in combination with the improvement comprising: turbo-supercharger means for compressing the combustion air prior to its entry in the working chambers; combustion air cooler means, including said heat exchanger and a cooling medium, for precooling the combustion air within said heat exchanger during normal operation of said engine to remove at least some of the heat of compression of said turbo-supercharger; temperature responsive control means for automatically operatively connecting said source of heat with said heat exchanger below a predetermined temperature and automatically operatively connecting said cooling medium with said heat exchanger above a predetermined temperature; engine cooling means having a circulating liquid medium; preheating means, including said source of heat for heating said liquid medium for cold engine starting; cooled radiator means for selectively cooling said heat transfer liquid during normal engine operation; second temperature responsive control means for automatically connecting said heat transfer liquid operatively in circuit with said radiator means above a predetermined temperature and for automatically connecting said heat exchange liquid operatively in circuit with said source of heat below a predetermined temperature.

5. The device of claim 4, including separate radiator means for selectively cooling said engine cooling means liquid; control valve means for selectively connecting said engine cooling means liquid operatively in circuit with said separate radiator means for normal operation and with said source of heat for cold engine starting.

6. The device of claim 1, including an engine block containing the working chambers; a liquid cooling radiator; an engine cooling system having a circulating liquid medium fluid connected between said block and said radiator; an engine heating system including said circulating liquid medium fluid connected between said block and said source of heat, for heating said block for cold engine starting; and means to switch from said engine cooling system to said engine heating system, and from said engine heating system to said engine cooling system.

References Cited
UNITED STATES PATENTS

| | | | |
|---|---|---|---|
| 1,821,662 | 9/1931 | Muller | 123—122 |
| 2,558,797 | 7/1951 | Theiss | 123—122 |
| 2,617,399 | 11/1952 | Backus | 123—142.5 |
| 2,630,106 | 3/1953 | Butts | 123—142.5 |

LAURENCE M. GOODRIDGE, *Primary Examiner.*